United States Patent [19]

Parsons et al.

[11] 4,189,753
[45] Feb. 19, 1980

[54] DOCUMENT SCANNING HEAD

[75] Inventors: Robert R. Parsons; John S. S. Wei, both of Ottawa, Canada

[73] Assignee: Northern Telecom Limited, Montreal, Canada

[21] Appl. No.: 913,658

[22] Filed: Jun. 8, 1978

[51] Int. Cl.² .............................................. H04N 1/12
[52] U.S. Cl. .................................... 358/294; 358/213; 358/293
[58] Field of Search ................ 358/213, 285, 293, 294

[56] References Cited

U.S. PATENT DOCUMENTS

| 3,544,713 | 12/1970 | Case | 358/213 |
| 3,603,730 | 9/1971 | Weigl | 358/294 |
| 3,676,586 | 7/1972 | Uno | 358/294 |
| 3,947,627 | 3/1976 | Tanaka | 358/293 |

Primary Examiner—Howard W. Britton
Attorney, Agent, or Firm—Sidney T. Jelly

[57] ABSTRACT

A scanning device for use in a facsimile system is formed on a semiconductor substrate. The substrate has an array of apertures, the boundary of each aperture presenting a pn junction which functions as a photodetector when appropriate bias is applied through sensing and addressing circuits. A light is directed through the apertures from one side of the substrate to be incident on a document located against the other side. The boundaries of the apertures are contoured so that the photodetectors intercept light reflected from the document but are shielded from direct light. In use, the document and the scanning device are slid past one another at a rate commensurate with the rate of operation of the addressing circuit.

14 Claims, 5 Drawing Figures

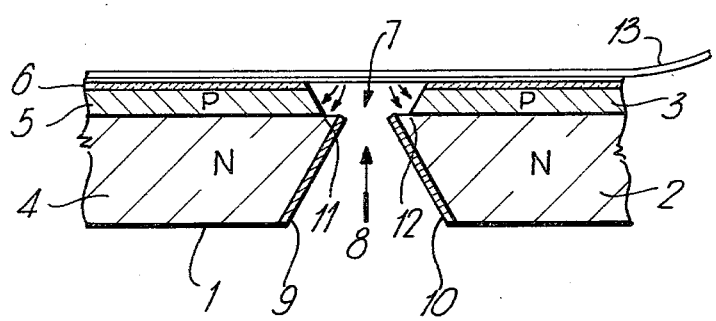
*Fig-1-*
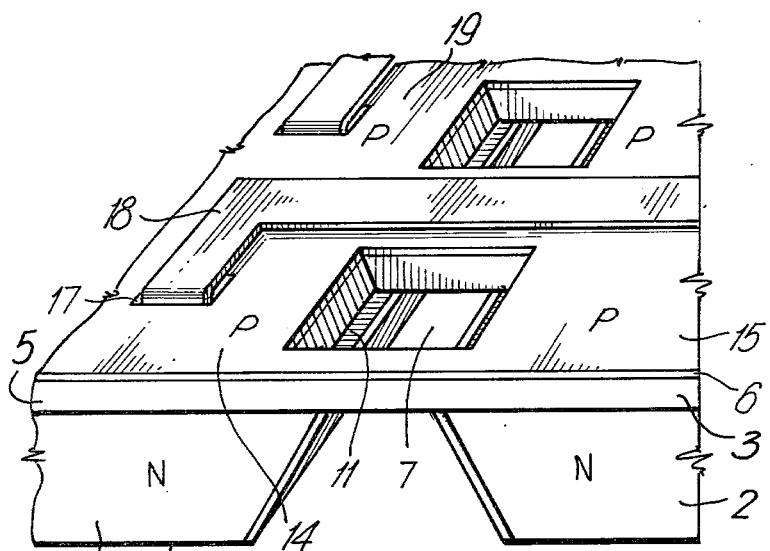
*Fig-2-*
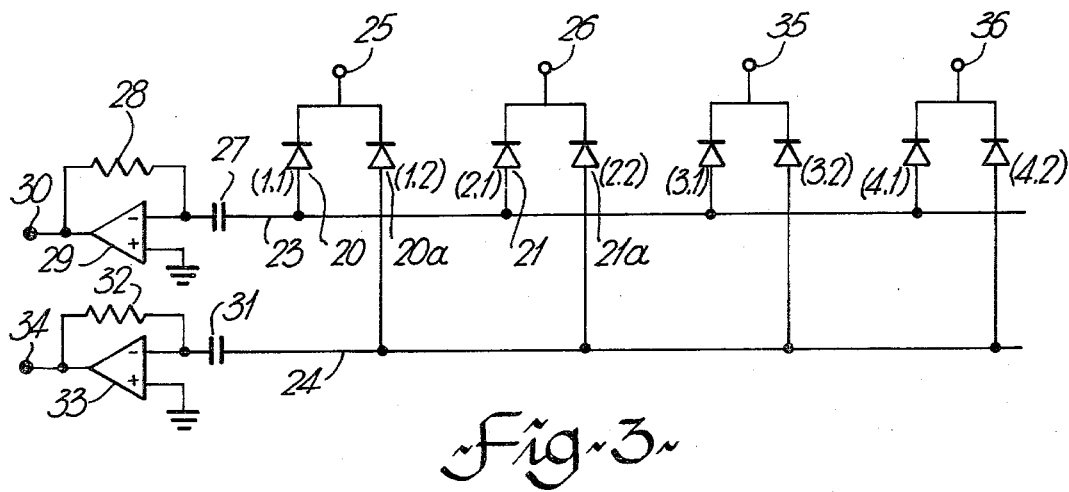
*Fig-3-*

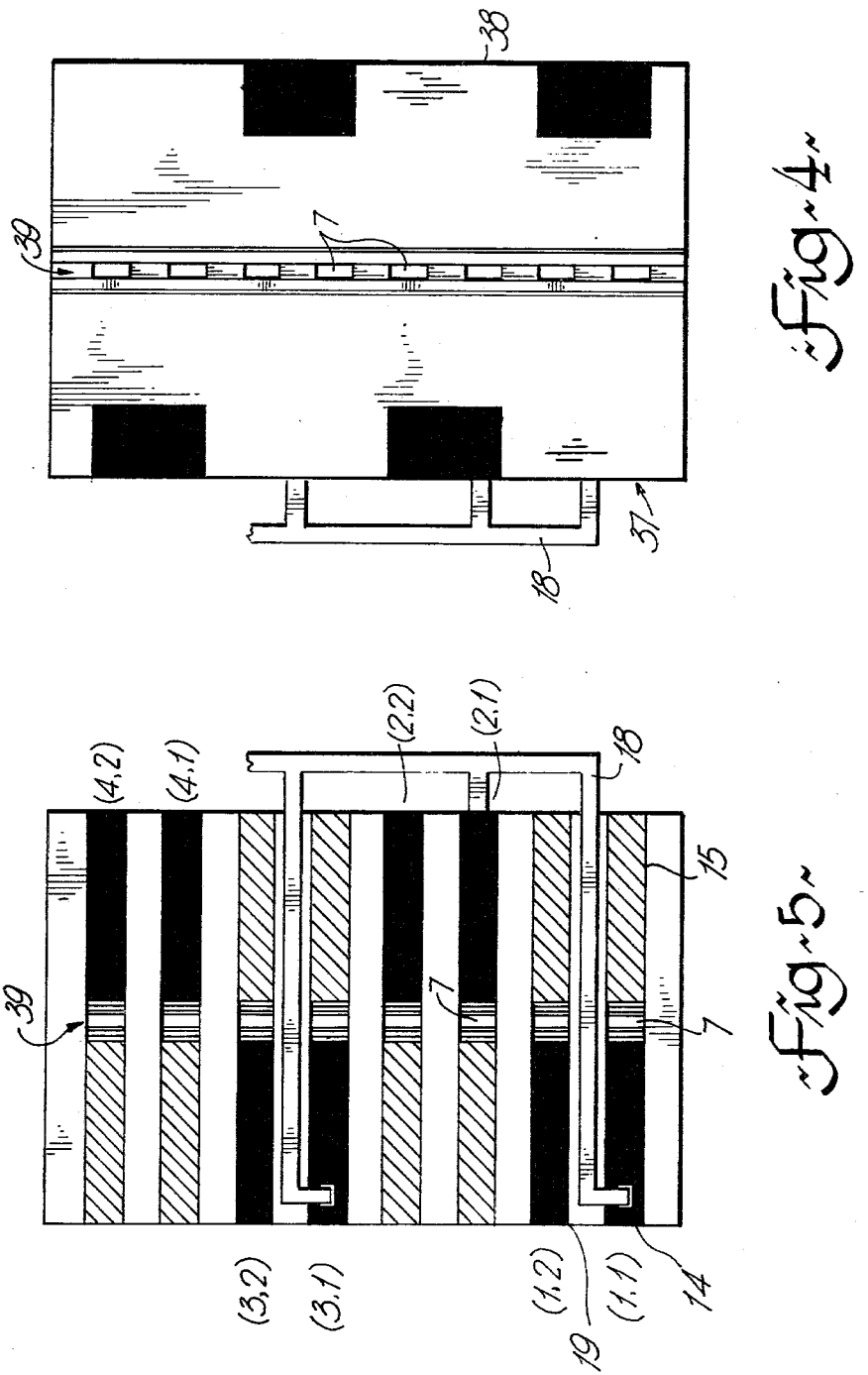

DOCUMENT SCANNING HEAD

This invention relates to a scanning device for scanning documents and extends to a method of using such a scanning device, for example, in connection with facsimile systems.

In scanning documents, it is often necessary to use a lens system to produce a small image of a page being scanned. The reason is that photodetectors usually are only obtainable in small sizes. To make many photodetector elements, device characteristics are more controllable if the detector array has restricted dimensions. However, as finer optical resolution becomes necessary, a larger number of detector elements must be accommodated on a single chip. For example, a charge coupled device (CCD) imager may have 1728 elements on a 1" chip. Small defects in the material or in the photomasks can easily incapacitate the entire CCD array.

The scanning device of the present invention obviates the lens system and produces a structure in which spacing between photodetector elements is relatively large thereby enabling reduced tolerances in fabrication.

According to one aspect of the invention there is provided a scanning device suitable for use in scanning documents, said device comprising a substrate of semiconductor material having a plurality of apertures therethrough, photodetector means formed in the semiconductor material and presenting device surfaces at the boundaries of the apertures, said semiconductor material being so contoured at the boundaries but the photodetector means are substantially shielded from direct incidence of light directed into the apertures from one side of the semiconductor material and intercept a substantial portion of light directed into the apertures from the other side of the semiconductor material.

The photodetector means can comprise photosensitive junctions between n and p type layers of semiconductor material, and the semiconductor material can be stepped over at least a part of the boundaries of the apertures so that one of the n and p type layers overhangs the other layer.

The apertures are preferably rectangular, the photodetector means at the boundary of each aperture comprising an element, the elements being arrayed in a regular rectangular matrix.

In typical embodiments of the invention the spatial density of the elements ranges from 50/sq.in., to 200/sq.in.

The preferred semiconductor materials are silicon or gallium arsenide especially such materials having crystallographic orientations permitting V-sectioned apertures to be readily etched in the material, since, in a preferred structure, at least a part of the boundaries of the apertures taper inwardly from an outer face of the semiconductor material to the junction between the n and p type layers.

The tapered parts bounding the overhanging layer should be covered with an opaque, non-reflecting coating so that light directed into the apertures is not reflected therefrom. The surface at the other side of the substrate should have a protected layer of, for example, oxide. In use a document to be scanned by the scanning device is held against the surface at the other side of the substrate and the document and the scanning device are slid relative to one another so the protected layer prevents deterioration of the p or n type layer at said other side of the substrate.

The scanning device can include electrical conducting regions formed in the semiconductor material for connecting the photosensitive junctions to sensing circuits. Preferably an addressing circuit is provided for cyclically addressing the sensing circuits.

An embodiment of the invention will now be described by way of example with references to the accompanying drawings, in which:

FIG. 1 is a cross-sectional view of an element of a scanning device according to the invention;

FIG. 2 is a perspective view showing a plurality of such elements;

FIG. 3 is a circuit diagram showing sensing circuitry and part of addressing circuitry for cyclically sensing elements of the scanning device; and FIGS. 4 and 5 show bottom and top surfaces of a part of the scanning device.

Referring to the drawings in detail, FIG. 1 shows a semiconductor substrate 1 for example silicon, which is doped to have n-type conductivity throughout. Afterwards, one surface of the substrate is doped to have p-type conductivity, shown as layers 3 and 5 in FIG. 1. With the appropriate electrical voltages applied to the n and p sides of the substrate, a photodiode or a photosensitive junction exists between the two layers at locations exemplified by 11 and 12. With light incident on 11, current flows between regions 4 and 5. This current is detected by a sensing circuit connected to the regions 4 and 5.

In use, the photosensitive junctions 11 and 12 function as sensors of a document reader. A document 13, is placed in intimate contact with a protected layer of, for example, silicone oxide thermally grown on the layer 5. The document is illuminated through an aperture 7 etched in the substrate 1. By choosing a substrate with the proper crystallographic orientation, V-shaped apertures can be etched with excellent definition. In FIG. 1, V-shaped apertures are fashioned on both sides of the junctions 11 and 12. The shape and slope of the apertures are arbitrary although the V-sections is preferred. It is important, however, that the aperture in the region of layers 3 and 5 be wider than that in the region of layers 2 and 4. Thus the photosensitive junctions 11 and 12 are shielded from the direct incidence of light coming from a source 8. Also, sides 9 and 10 of the aperture are coated with an opaque film to avoid generating reflections from the sides which may be incident directly on the photosensitive junctions. Because of the narrow aperture 7, only a small region of the document 13 is illuminated. Light reflected from the document falls on junctions 11 and 12. The size of the detected signal depends directly on the amount of light reflected. A dark printed spot on a white document, for instance, would reflect little light compared to that from the white background. By moving either the document 13 or the scanning device, it is possible to reconstruct a pattern on the document from detected signals.

Referring to the perspective view of FIG. 2, the apertures 7 which are in the form of windows isolate strips 14 and 15 of the p-type layer from one another. The array of apertures 7 and the p-type regions such as 14 and 15 are fabricated on a single substrate of semiconductor material. A window 17 is also etched through the protective layer 6. The strip of conducting material 18 makes electrical contact with the p-type region 14. The conducting strip 18 is used to electrically connect together photosensors on either side of the aperture 7 as described with reference to FIG. 5. Conducting strips similar to 18 are used also on the substrate for connection to the sensing and addressing circuitry.

In order to detect the light induced signals, a column and a row electrical addressing circuit is used as shown in FIG. 3. A p-type region, such as 14 in FIG. 2, together with the associated photosensitive junction 11, is symbolized as 20 in the FIG. 3. Region 19 and its photosensitive junction are shown as 20a in FIG. 3. In an electrical addressing scheme used, 20 and 20a are labelled (1,1) and (1,2) respectively. The column label is the first number in the bracket and the row label the second. When a column 1 terminal, 25, is pulsed to a positive voltage, for example 5 volts, devices 20 and 20a are properly biased to collect current generated by incident light. The current from (1,1) is AC coupled through a capacitor 27 to an amplifier 29 and resistor 28, resulting in an output signal at a terminal 30. The light induced signal from (1,2), on the other hand, appears at terminal 34, after similar amplification. When terminal 25 is pulsed positive, terminals 26, 35, 36, etc. are held at zero voltage by a timing circuit (not shown). Thus only the photosensitivities of elements (1,1) and (1,2) are enhanced. Thus signals from a particular column are identified by pulsing only that column positive while holding all the rest at zero voltage. Interconnecting lines such as 23 and 24 are fabricated on the substrate. Therefore, instead of lines addressing the elements individually, a considerably small number of external connections suffices. In practice, each column has more than two elements shown in FIG. 3. For example, 1600 photosensitive elements can be connected in a 40 column by 40 row matrix. Only 80 external connections need be made, 40 for column terminals such as 25 in FIG. 3, and 40 for outputs such as 30 in FIG. 3. In the circuit of FIG. 3, lines 23 and 24 are held at AC ground by action of the amplifier 29. Because of the photosensor characteristics of elements such as 20, little current can flow when the column terminal, for example, 25 is held at ground. Capacitor 27 is used to block leakage current through the photosensitive junctions in the absence of light; with low leakage, the capacitor can be dispensed with.

An exemplary pattern of electrical connections to the photosensitive sides 11 and 12 is shown in detail in FIGS. 4 and 5. The substrate 1 is heavily doped n type so that regions such as 2 and 4 shown in FIG. 1 as the bottom of the substrate are sufficiently conducting. Detectors 14 and 19 shown in the top elevation of FIG. 5 can be connected in parallel by a block contact 37 at the bottom of the substrate as shown in FIG. 4. The contact 37 corresponds to the column terminal 25 in FIG. 3. If the substrate is thick compared to the spacing between photosensors, a voltage applied to 37 may affect other photosensors in parallel with 14 and 19. A zig-zag type of detector arrangement can be used to solve this problem. Thus as shown in FIG. 4, the second column connection 38 is made on the side opposite to 37, across the line of apertures 39. The connection 38 would correspond to column terminal 26 in FIG. 3. In effect, only half the available photosensors are in use. The two sensors between (1,2) and (3,1), for example, are not used. This redundancy alleviates problems in manufacturing yield; only half the photosensors have to function. The row connections are shown in FIG. 5. Element (1,1) is connected to element (2,1) by a conducting strip 18 shown in part in FIG. 1. A similar strip connects (1,2), (2,2) and (3,2).

In a typical embodiment of the invention the spatial density of apertures is of the order of 200/sq.in., the area of the apertures is of the order of 25 sq.mm. and the area of the photosensitive junctions at each aperture is also of the order of 25 sq.mm.

What is claimed is:

1. A scanning device suitable for use in scanning documents, said device comprising a substrate of semiconductor material having a plurality of apertures therethrough, photodetector means formed in the semiconductor material and presenting active surfaces at the boundaries of the apertures, said semiconductor material being so contoured at the boundaries of the apertures that the photodetector means are substantially shielded from direct incidence of light directed into the apertures from one side of the semiconductor material and intercept a substantial portion of light directed into the apertures from the other side of the semiconductor material.

2. A scanning device as claimed in claim 1, wherein the semiconductor material is one of the group consisting of silicon arsenide and gallium arsenide.

3. A scanning device as claimed in claim 1, further including means for locating a document against the outer face of the semiconductor material at said other side thereof and means for moving the document and the scanning device relative to one another.

4. A scanning device as claimed in claim 1, wherein the apertures are rectangular, the photodetector means at the boundary of each aperture comprising an element, the elements being arrayed in a regular rectangular matrix.

5. A scanning device as claimed in claim 4, wherein the spatial density of elements ranges from 50/sq.in., to 200/sq.in.

6. A scanning device as claimed in claim 1, wherein the photodetector means comprises photosensitive junctions formed between n and p type layers of the semiconductor material, and the semiconductor material is stepped over at least a part of the boundaries of the apertures so that one of the n and p type layers overhangs the other layer.

7. A scanning device as claimed in claim 6, wherein electrically conducting regions on said semiconductor material connect said photosensitive junctions to respective sensing circuits.

8. A scanning device as claimed in claim 7, wherein electrically conducting regions also extend between adjacent pairs of photosensitive junctions so that the conducting state of a plurality of photosensitive junctions can be sensed together.

9. A scanning device as claimed in claim 7, and also including an addressing circuit to cyclically operate the sensing circuits.

10. A scanning device as claimed in claim 6, wherein at least a part of the boundaries of the apertures taper inwardly from outer faces of the semiconductor material to the junction between the p and n type layers.

11. A scanning device as claimed in claim 10, wherein at least part of the tapered boundaries follow natural crystallographic planes of the semiconductor material.

12. A scanning device as claimed in claim 10, wherein the tapered parts bounding the overhanging layer have an opaque coating.

13. A scanning device as claimed in claim 10, wherein an outer face of the semiconductor material at said other side thereof has a protective oxide layer.

14. A method of using a scanning device having a substrate of semiconductor material, a plurality of apertures therethrough, photodetector means formed in the semiconductor material and presenting active surfaces at the boundaries of the apertures, the semiconductor material being so contoured at the boundaries of the apertures that the photodetector means are substantially shielded from direct incidence of light directed into the apertures from one side of the semiconductor material and intercept a substantial portion of light directed into the apertures from the other side of the semiconductor material, electrically conducting regions on said semiconductor material connecting said photosensitive junctions to respective sensing circuits to sense the condition of said photosensitive junctions, and an addressing circuit to cyclically address the sensing circuits, said method comprising:

locating a document to be scanned against an outer surface of the semiconductor material at said other side thereof;

directing light through the apertures in the semiconductor material to illuminate areas of the document; and simultaneously with operating the addressing circuit to cyclically address the sensing circuits;

sliding the document and the scanning device relative to one another at a velocity commensurate with the cyclic operation of the addressing circuit.

* * * * *